(No Model.)  3 Sheets—Sheet 2.
C. O. MAILLOUX.
ELECTRICAL CONTROLLING SYSTEM FOR ELEVATORS.
No. 543,495.  Patented July 30, 1895.
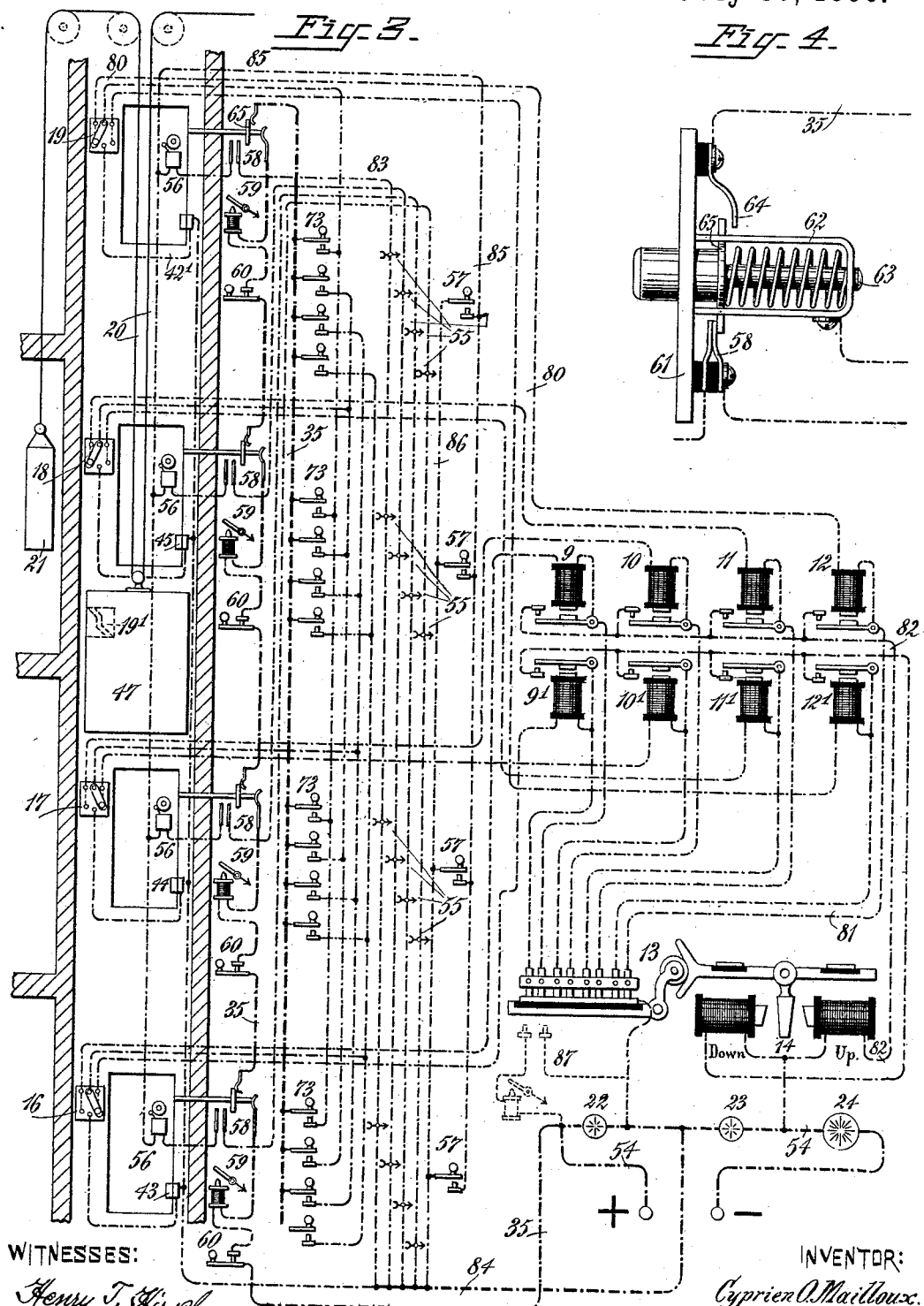
WITNESSES:
Henry T. Hirsel
M. T. Capel
INVENTOR:
Cyprien O. Mailloux.
H. C. Townsend
ATTORNEY.

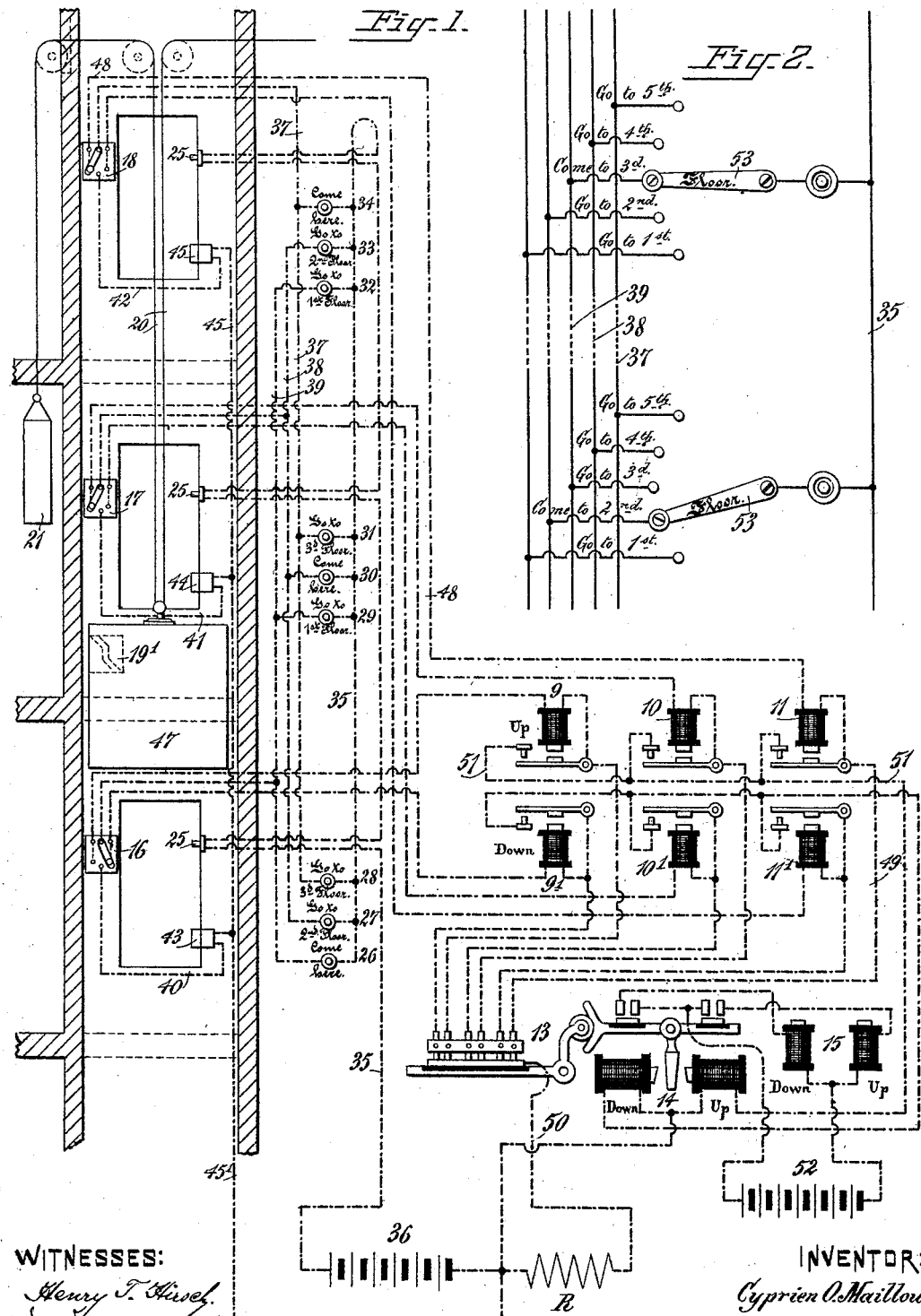

(No Model.) 3 Sheets—Sheet 3.
C. O. MAILLOUX.
ELECTRICAL CONTROLLING SYSTEM FOR ELEVATORS.
No. 543,495. Patented July 30, 1895.
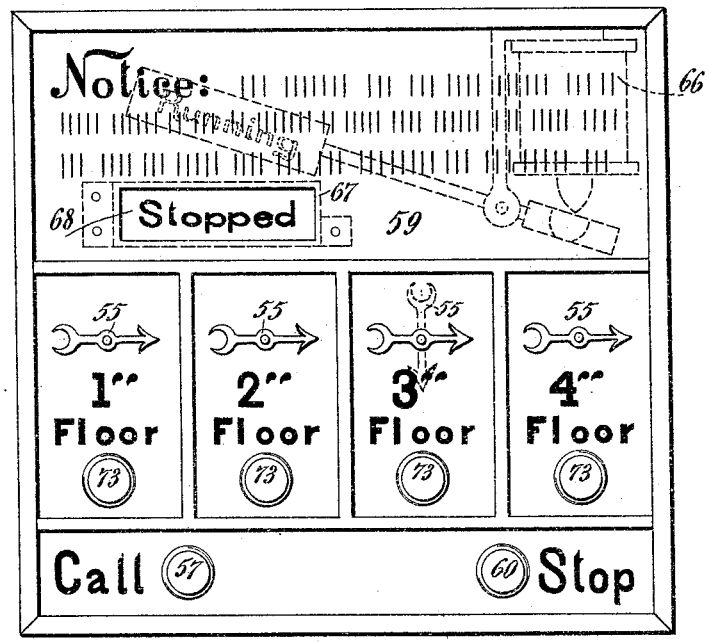
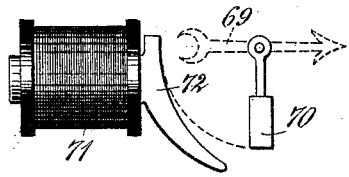
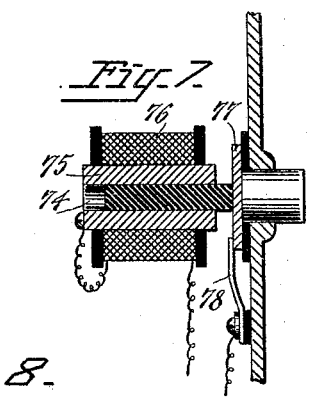
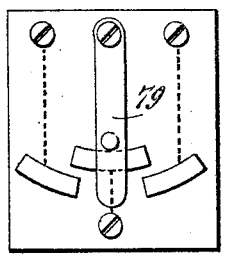
WITNESSES:
Henry T. Hirsch.
Wm. H. Capel
INVENTOR:
Cyprien O. Mailloux.
by H. C. Townsend
ATTORNEY.

UNITED STATES PATENT OFFICE.

CYPRIEN O. MAILLOUX, OF NEW YORK, N. Y.

ELECTRICAL CONTROLLING SYSTEM FOR ELEVATORS.

SPECIFICATION forming part of Letters Patent No. 543,495, dated July 30, 1895.

Application filed May 28, 1895. Serial No. 550,922. (No model.)

*To all whom it may concern:*

Be it known that I, CYPRIEN O. MAILLOUX, a citizen of the United States, and a resident of New York, in the county of New York and State of New York, have invented a certain new and useful Electrical Controlling System for Elevator and other Cars, of which the following is a specification.

My invention relates to improvements in systems for electrically controlling and directing the movement of elevator and other cars, and particularly those known as "dumb-waiters" and "lifts," which are moved by any suitable power—such as steam, water or electricity.

The invention is especially adapted to those moved electrically, since the controlling and directing appliances may be supplied with current from the same source as that operating the motor.

The main object of this invention is the production of a system in which will be combined absolute safety and simplicity in the manipulation of the car. This system is so instituted and arranged that it will be impossible for any one to run the car so long as any of the landing-doors are open or to open any of said doors so long as the car is running. Further, no one can obtain control of the car while it is being operated by another. To show that the car is being operated by another suitable indicators will announce the fact at each landing. The opening of the landing-doors is controlled by the car, which opens only the door of that particular landing for which it is started. As soon as the car reaches that landing it is automatically stopped and the door automatically opened. The car cannot be moved again by any one so long as the door is open; therefore the user cannot be injured by the starting of the car while he is loading or unloading it. When he has loaded it, he may, on closing the door and pressing a certain button or closing a certain switch, send it to the particular landing indicated by that switch. When it has reached that landing and the door has been opened, the fact will be shown at every landing by an indicator located at each landing. Should the user fail to close the door, he may be warned to do so by a person at any other landing who wishes the car. For this purpose bells or buzzers are located at each door, each of which may be operated from any landing.

This invention resides mainly in the adaptation to the above purposes of certain devices and arrangements of apparatus set forth in United States Letters Patent, granted to me April 2, 1895, No. 536,730, wherein a car is controllable either from within or from a landing. Obviously that portion of said system controlled from the car could readily be combined with the system herein shown, in case this system were applied to a car adapted to carry a person. It is likewise obvious that the directing and indicating features of this system could be readily incorporated in the system shown in said patent.

In describing this invention only those features not found in said patent and those found therein which have been changed in form and operation will be described in detail.

With the objects in view, as above set forth, my invention consists in an electrical controlling system for elevator or other cars, wherein, by the operation of suitable switches located at each floor or landing, a person at a certain landing can bring the car to him or direct its course to any other landing.

It also consists in the combination with such a controlling and directing system of suitable indicators for showing at each landing the operation and location of the car.

It further consists in the construction, combination, and arrangement of parts hereinafter fully described, and set forth in the claims.

In the accompanying drawings, forming a part of this specification, Figure 1 represents, diagrammatically, the elementary form of my invention. Fig. 2 shows a modification of the controlling and directing switches. Fig. 3 represents, diagrammatically, my controlling system fully developed. Fig. 4 represents a door circuit breaker and maker. Fig. 5 represents in face view a casing containing the several indicators and push-buttons located at each landing. Fig. 6 represents in detail one of the landing-indicators. Fig. 7 represents in vertical section one of the landing-switches or push-buttons. Fig. 8 represents the preferred form of floor-switch.

I will first describe the system in its elementary form, as illustrated in Fig. 1, premising by mentioning the several parts of the system, as disclosed in Figs. 1 and 3, which have been fully set forth in my patent above referred to. These parts are the individual relays 9 10 11 12 and 9' 10' 11' 12', the non-interference switch 13, the starting-relay 14, the starting-magnets 15, the floor-switches 16 17 18 19, the block 19', the car-cables 20, and the counterpoise 21, and in Fig. 3 a series of resistances 22, 23, and 24. Also, in Fig. 1, the door circuit-breakers 25 are the same as in said patent. The wiring, also, is substantially the same, there being, however, three landing-switches at each floor instead of one, as in said patent. These switches are represented as push-buttons at 26 27 28 at the first floor, 29 30 31 at the second floor, 32 33 34 at the third floor. Each of these buttons are connected to the main branch 35 of the circuit leading from the source of energy, indicated at 36, and the uppermost one of each series is connected to the same conductor 37, which leads to the switch-arm of the upper floor-switch 18. Each of the middle buttons of the series is connected to the circuit 38, which leads to the switch-arm of the floor-switch 17, and each of the lower buttons of the series is connected to the circuit 39, which leads to the switch-arm of the floor-switch 16. Said floor-switches are, as shown and fully set forth in my patent, connected to their respective individual relays. Said floor-switches are also connected by circuits 40, 41, and 42, respectively, to the locks or door-opening devices, indicated at 43, 44, and 45, from which the common return 45' leads to the source 36.

With the references to my patent as above and the following statement of the operation of this system, a full disclosure of the elementary form of my invention will be made.

The landing-switches 26 to 34 may be self-holding switches or not, as desired. In this illustration they are considered as not self-holding. The car is represented at 47 as having been stopped between the first and second floors. Supposing, now, a person at the third floor desires the car. By pushing button 34 the car will come to that floor, and as it passes floor-switch 17 the lever thereof will be shifted to the right-hand contact by means of the frog 19', and as the car reaches the third floor said frog will shift the lever of switch 18 onto the middle contact, thereby breaking the controlling-circuit and closing the lock-circuit. Immediately upon the closure of the lock-circuit the well-door will be opened by the action of the spring in the door-circuit breaker 25, the circuit being at the same time broken at that point.

The path of the controlling-circuit just mentioned is as follows: Starting from the source 36, over conductor 35, through each of the door-circuit breakers 25, thence through button 34, conductor 37, contact-arm of switch 18, circuit 48, individual relay 11, circuit 49, to non-interference switch 13, thence by the common return 50, through resistance R to the source 36. The current traversing relay 11 causes it to attract its armature and close circuit through conductor 51 to the "up" magnet of the starting-relay 14 and through that to the source, thereby actuating the starting-relay to close circuit through the up magnet 15 and the generator 52, coupled thereto. The magnets 15 operate to throw the motor into action for moving the car. Should the person now at the third floor wish to send the car to the first floor, he has simply to close the well-door and press button 32, when the car will immediately descend until it reaches and operates the first-floor switch 16, when it will be stopped and the well-door of the first floor opened, as above described with respect to the well-door of the third floor. The operation of button 32 closed a circuit, substantially as described, through the "down" individual relay 9', the starting-relay, and the starting or switching magnet 15, and the stopping of the car when it reached the first floor was caused by the breaking of the circuit to the individual relay 9' by the shifting of the switch-lever at 16 from the right-hand contact. If the car had been at any other position in the shaft when button 32 was pressed, it would in the same manner have been obliged to travel to the first floor. In this manner a person at any floor may send the car to any other floor as well as bring it to the floor at which the person is. In this figure I have illustrated but three floors. It is obvious that the system may be extended to any number of floors, and in case of such extension it is advisable to change the form of landing-switches to substantially that indicated in Fig. 2, wherein a single push-button is shown connected between the leading circuit 35 and switch-levers 53, and a series of contacts, as indicated, are connected to the common circuits 37 38 39, &c. To operate this system when these switches are used it is simply necessary to move the switch-lever onto the contact corresponding to the floor to which it is desired to bring or send the car and then push the button.

In Fig. 3, I have shown the controlling system as connected to a dynamo-circuit, as fully set forth in my patent. Such circuit is represented at 54 as containing resistances 22 23 24, which preferably consist of incandescent lamps. In this view the starting or switching magnets and circuits have been omitted. The system just described with respect to Fig. 1 forms the basis of that shown in Fig. 3, to it having been added the indicators 55, which show at each floor the opening of any one of the well-doors. There have also been added the bells or buzzers 56 and the buttons or switches 57 for closing the circuit of said bells to call the attention of the person at the floor where the door is open to the fact that the door is open. There have also been added circuit-making contacts 58 to the door-circuit breaker, as represented in detail in Fig. 4. I have also added a running-indicator, as at 59, which shall show whether or not the car is running. In addition to these I have inserted in the main controlling-circuit a stop-button or switch 60, by which the car may be stopped at any position. Before describing the operation of this system I will describe in detail the several new features.

The door-circuit maker and breaker, as seen in Fig. 4, consists of a plate 61, to which is secured a guide 62 for the reciprocating-bar 63, around whose stem is placed a spring for forcing it outward, it being forced inward by the closure of the door. Upon plate 61 is mounted a contact-spring 64 in the main branch 35 of the controlling-circuit, and also upon said plate, and insulated from one another, are the contact-springs 58, connected in the call-bell circuit. To the bar 63 is attached a contact, as 65, which, when the door is opened, closes connection between the circuit 35 and the bell and indicator circuits, and which, when the door is closed, breaks the circuits last mentioned and closes the circuit 35.

The several indicators and push-buttons at each landing I group in a suitable casing, as indicated in Fig. 5. Preferably in the upper part of the casing I locate the running-indicator 59, which may be of any suitable construction, but which I have shown consisting of a magnet 66 provided with a pointed pole and with an armature formed to co-operate therewith for long-range attraction. To this armature I connect a vane on which is printed the word "Running." In the case is formed an opening, as 67, behind which and fixed to the casing is a plate 68, on which is printed the word "Stopped." This plate 68 is at a sufficient distance from the face of the casing to allow the plate carrying the word "Running" to be thrown in front thereof. The magnet 66, as indicated in Fig. 3, is located in the main branch 35 of the controlling-circuit, so that whenever the controlling-circuit is closed to cause the movement of the car, this indicator will present the word "Running" before the opening 67, and when the car comes to a stop either at a landing or by the operation of switches 60, the word "Running" will disappear from the opening and leave the word "Stopped" in view. In the same casing are located the annunciators or indicators 55, similar to those now used in elevator-cars. The form preferred by me is shown in Fig. 6, wherein a dart 69 is fixed to a pivoted bar carrying an armature 70, controlled by a magnet 71 having a horn-shaped pole-piece 72, as indicated. When the magnet is energized the armature is attracted and swung into a horizontal position, thereby causing the dart 69 to assume a vertical position and point to the name of the floor to which said dart is assigned. Also in the casing I mount the landing switches or buttons 73, which I prefer to make self-holding and of the form indicated in Fig. 7, wherein the button is shown provided with a stem of insulating material 74, which is seated in the hollow core 75 of the magnet 76. On this stem is an armature 77, with which engages a spring 78, suitably insulated from the case for the purpose of returning the button to its normal position and at the same time making electrical contact with the armature. The coil of the armature is electrically connected to the core, so that when the push-button is pressed circuit will be closed from spring 78, through the armature 77, the core 75, and the coil 76, thereby energizing the magnet and holding the button depressed until the circuit is broken. The circuit through the coil 76 is a branch from the main circuit 35. I also prefer to mount in the case with the indicators and buttons just described the call-button 57 and stop-button 60, which may be of any convenient form of push-button.

The type of floor-switch which I prefer to use in this system is represented in Fig. 8, wherein the contacts for the lock and individual relay-circuits are shown as plates so located that the switch-lever 79 will make contact with one of said plates before breaking it with another, thereby preventing the rupture of the main controlling-circuit before the circuit is made through the lock. Upon this casing I place a suitable notice explaining the operation of the indicators. Such notice may be as follows: "The machine will not work unless all landing-doors are closed. The annunciator-arrows indicate the floor at which a door is open. By pressing the call-button an alarm will be operated at that floor."

In Fig. 3 the parts just described are shown diagrammatically represented. The operation of the system shown in this figure is as follows: The car 47 having been left between the second and third floors, and a person at the fourth floor wanting it, the upper button 73 at said floor is pressed. This closes circuit from conductor 54, over branch 35, through the stop-switches, running-indicators and door-circuit breakers at each of the several floors to said button, thence to the contact-lever of switch 19 and over circuit 80 to individual relay 12, thence by circuit 81 to and through the non-interference switch back to circuit 54, between resistance 22 and 23. This energizes relay 12, which draws up its armature and thereby closes circuit over branch 82 to the up-magnet of the starting-relay 14, thence to circuit 54, between resistance 23 and 24. By the action of the starting-relay the motor is thrown into operation, as previously described in connection with Fig. 1. The car then ascends, and as it passes floor-switch 18 the frog 19' shifts the contact-switch onto the right-hand contact, and as the car reaches the fourth floor it shifts the contact-lever of switch 19 from the left-hand contact onto the middle contact, thereby breaking the controlling-circuit, stopping the motor, and closing the lock-circuit 42, releasing the door, and allowing the spring-pressed rod 63 to force it open sufficiently to prevent its being relocked and to break the circuit 35 and make circuit at the contacts 58. When button 73 was pressed, all the indicators 59 were operated to show that the car was running. As soon as the car came to a stop and the circuit was broken at switch 19 these indicators withdrew the word "Running" and uncovered the word "Stopped." Then upon the closure of circuit at contacts 58 the path of the current was as follows: from branch 35, through contacts 65 58, circuit 83, through coils 71 of the fourth-floor indicators 55, to the common return 84, and back to circuit 54, between the resistance 22 and 23. Should, now, the one who called the car leave it without closing the door, and another person, say, at the second floor, desire it, he would see from the position of the fourth-floor indicator that the well-door was open at the fourth floor. He would then press button 57, which would close circuit through the bell 56 at the fourth floor, over the following path: from circuit 35, through contacts 65 and 58, fourth-floor bell 56, circuit 85, second-floor call-button 57, circuit 86, to the common return 84. Then upon the closure of the well-door at the fourth floor the person at the second floor, should he desire the car to come to his floor, would push the second-floor button 73, when circuit would be closed through the down-relay corresponding to that floor and the switching-magnet operated to start the motor, substantially in the manner above set forth. Should he, however, desire to direct the car to the first floor, he would press the first-floor button 73 at the second floor where he is, when the circuits would be closed, substantially as above described, and the car moved to the first floor. Of its arrival at said floor notice would be given at all the floors by the action of the first-floor annunciators 55, as the well-door of the first floor was thrown open upon the stopping of the car. Obviously, the landing-switches shown in Fig. 2 could be substituted for the buttons 73, as described in connection with Fig. 1. Instead of placing the running-indicators in the main branch 35 they might be placed in a separate branch or circuit closed by the action of the non-interference switch, substantially as indicated in dotted lines at 87 in Fig. 3. Obviously, this system, as above disclosed, might be as well applied to the control and operation of a car moving on a horizontal track—as, for instance, in large warehouses—for the purpose of transferring goods from one part thereof to another.

The arrangement of circuits and the manner of connecting the various devices located therein, as well as the construction of said devices, may be greatly varied without departing from the spirit of my invention.

What I claim as my invention is—

1. In an electric controlling system for elevator or other cars, the combination with the controlling switch at each landing for calling the car to that landing, of duplicate switches corresponding to the controlling switches at other landings whereby the car may from one landing be directed to any of the others, substantially as set forth.

2. In an electrical controlling system for elevator or other cars, the combination with the controlling circuit, of floor switches automatically operated by the car, and multiple switches at the several landings, like members of which are connected together and to a floor switch.

3. In an electrical controlling system for elevator or other cars, the combination with the controlling circuits, of electrically operated running indicators at each landing thrown simultaneously into and out of operation respectively by the starting and stopping of the car.

4. In an electric controlling system for elevator or other cars, the combination with the well doors, of indicators at each floor, and means operated on the opening of a well door to actuate one indicator on each floor to announce such opening for the purpose set forth.

5. In an electrical controlling system for elevator or other cars, the combination with well doors automatically opened by the action of the car, a series of branches from the controlling circuit, contacts located in each branch to be closed on the opening of the well doors, and indicators in each branch at each landing for enunciating at all landings the opening of a well door.

6. In an electrical controlling system for elevator or other cars, the combination with the well doors, of a bell or buzzer located at each door and having its circuit controlled by the position of that door, and a switch at each landing for closing circuit through that bell whose door has been left open, as and for the purpose set forth.

7. In an electrical controlling system for elevator or other cars, the combination with the well door indicators, of a bell or buzzer located at each door in a branch circuit closed on opening that door, and a button at each floor for completing the circuit through any one of said buzzers whose door has been left open.

8. In an electrical controlling system for elevator or other cars, the combination with the main controlling circuit, of a bar spring-mounted in a suitable guide in a well door frame, a spring for forcing said bar outward against the door, a contact carried by said bar and connected to said cicuit, a contact also connected to said circuit and located in a position to engage said contact when the door is closed, and contact springs in the buzzer and door indicator circuits located in a position to be engaged by said bar contact when the door is open, for the purpose specified.

9. In an electrical controlling system for elevator or other cars, the combination with a casing located at a landing, a running indicator located therein and consisting of a magnetically controlled vane bearing the word "Running" and a fixed plate bearing the word "Stopped" the latter being covered by the former in one of its positions, magnetically operated door indicators also located in said casing, landing switches corresponding to each door indicator located in close proximity thereto in said casing, and a stop switch and a call switch operating the buzzers also located in said casing.

10. In an electrical controlling system for elevator or other cars, the combination with self-holding push-buttons in the controlling circuit at the landings, of floor switches located in the path of the car and consisting of a pivoted contact lever connected to the controlling circuit, and overlapping contact plates connected to branches of the controlling circuit and to the lock circuit, and means carried by the car for shifting said levers from one contact to another, as and for the purpose set forth.

11. In a push button, the combination of a hollow magnet core, a push closing circuit on said core, and having a self-holding armature and a guide pin of insulating material working in the core.

12. In an electrical controlling system for elevator or other cars, the combination with the controlling circuit, of landing switches consisting of self-holding push buttons comprising a push pin provided with a stem of insulation, an armature connected thereto, a spring connected to the controlling circuit and bearing on said armature for making electrical contact therewith and for returning the push to normal position, and an electromagnet provided with a hollow core for the reception of the push-pin stem and having one end of its coil connected to said core, as and for the purpose set forth.

Signed at New York, in the county of New York and State of New York, this 23d day of May, A. D. 1895.

CYPRIEN O. MAILLOUX.

Witnesses:
WM. H. CAPEL,
DILBERT H. DECKER.